(12) United States Patent
Pitzer et al.

(10) Patent No.: US 11,279,394 B2
(45) Date of Patent: Mar. 22, 2022

(54) STEERING COLUMN ASSEMBLY

(71) Applicant: R.H. SHEPPARD CO., INC., Hanover, PA (US)

(72) Inventors: Jared Pitzer, Red Lion, PA (US); Eric Geib, Auburn Hills, MI (US); Jeffrey Tipton, Gettysburg, PA (US)

(73) Assignee: R.H. Sheppard Co., Inc., Hannover, PA (US)

( * ) Notice: Subject to any disclaimer, the term of this patent is extended or adjusted under 35 U.S.C. 154(b) by 104 days.

(21) Appl. No.: 16/612,156

(22) PCT Filed: May 11, 2018

(86) PCT No.: PCT/US2018/032227
§ 371 (c)(1),
(2) Date: Nov. 8, 2019

(87) PCT Pub. No.: WO2018/209183
PCT Pub. Date: Nov. 15, 2018

(65) Prior Publication Data
US 2021/0078627 A1   Mar. 18, 2021

Related U.S. Application Data

(60) Provisional application No. 62/504,787, filed on May 11, 2017.

(51) Int. Cl.
*B62D 1/189* (2006.01)
*B62D 1/184* (2006.01)

(52) U.S. Cl.
CPC ............. *B62D 1/189* (2013.01); *B62D 1/184* (2013.01)

(58) Field of Classification Search
CPC ..................................................... B62D 1/184
See application file for complete search history.

(56) References Cited

U.S. PATENT DOCUMENTS 4,507,982 A * 4/1985 Turner ................... B62D 1/184
280/775
5,606,891 A * 3/1997 Tisell ..................... B62D 1/184
280/775

(Continued)

FOREIGN PATENT DOCUMENTS

DE       3909668 A1 * 10/1989 ............. B62D 1/184
DE    19933677 B4 * 10/2005 ............. B62D 1/184

(Continued)

OTHER PUBLICATIONS

International Search Report for PCT/US2018/032227 dated Oct. 8, 2018, 6 pages.

*Primary Examiner* — Nicole T Verley
(74) *Attorney, Agent, or Firm* — Warner Norcross + Judd LLP

(57) ABSTRACT

A steering column assembly comprises a mounting bracket (100), a steering column (200), a plurality of friction plates (300), a plurality of inner spacers (501), and a locking mechanism (400). The friction plates (300) are fixed to the steering column (200) and attached to a side of the mounting bracket (100). The friction plates (300) are movable with respect to the mounting bracket (100). The inner spacers (502) are interleaved with the plurality of friction plates (300). Each inner spacer (502) has a scored outer surface (540). The locking mechanism (400) is operable to press the inner spacers (501) and friction plates (300) together to lock the steering column (200) with respect to the mounting bracket (100).

16 Claims, 16 Drawing Sheets

(56) References Cited

U.S. PATENT DOCUMENTS

| | | | | |
|---|---|---|---|---|
| 6,095,012 A * | 8/2000 | Lutz | ............... | B62D 1/184 |
| | | | | 74/493 |
| 6,810,574 B1 * | 11/2004 | Luthi | ............... | B21J 15/02 |
| | | | | 29/469.5 |
| 7,775,137 B2 | 8/2010 | Arbanas et al. | | |
| 8,091,449 B2 | 1/2012 | Fuchigami et al. | | |
| 8,746,740 B2 | 6/2014 | Tanaka | | |
| 9,415,795 B2 | 8/2016 | Hagiwara et al. | | |
| 2003/0188598 A1 * | 10/2003 | Cartwright | ............... | B62D 1/184 |
| | | | | 74/493 |
| 2003/0205893 A1 * | 11/2003 | Livengood | ............... | B62D 1/184 |
| | | | | 280/775 |
| 2004/0056466 A1 * | 3/2004 | Hobaugh, II | ............... | B62D 1/184 |
| | | | | 280/775 |
| 2004/0155448 A1 * | 8/2004 | Klukowski | ............... | B62D 1/184 |
| | | | | 280/777 |
| 2004/0182829 A1 * | 9/2004 | Johr | ............... | B23K 11/14 |
| | | | | 219/117.1 |
| 2005/0121895 A1 * | 6/2005 | Manwaring | ............... | B62D 1/184 |
| | | | | 280/775 |
| 2006/0097500 A1 * | 5/2006 | Peppler | ............... | B62D 1/184 |
| | | | | 280/775 |
| 2006/0267328 A1 * | 11/2006 | Eggers | ............... | B62D 1/184 |
| | | | | 280/775 |
| 2007/0164549 A1 * | 7/2007 | Bastein | ............... | B62D 1/184 |
| | | | | 280/777 |
| 2010/0186536 A1 | 7/2010 | Cartwright | | |
| 2013/0327177 A1 * | 12/2013 | Tanaka | ............... | B62D 1/184 |
| | | | | 74/493 |
| 2015/0239489 A1 * | 8/2015 | Matsuno | ............... | B62D 1/189 |
| | | | | 74/493 |
| 2016/0107675 A1 * | 4/2016 | Yamada | ............... | B62D 1/184 |
| | | | | 74/493 |
| 2016/0272234 A1 * | 9/2016 | Terasawa | ............... | B62D 1/185 |

FOREIGN PATENT DOCUMENTS

| | | | | |
|---|---|---|---|---|
| DE | 102006007553 B3 | | 5/2007 | |
| DE | 102007021907 A1 * | | 12/2007 | ............ B62D 1/183 |
| EP | 0802104 A1 | | 10/1997 | |
| EP | 1332942 A2 | | 8/2003 | |
| GB | 2377471 A | | 1/2003 | |
| WO | 200128710 A1 | | 4/2001 | |

* cited by examiner

STEERING COLUMN ASSEMBLY

CROSS-REFERENCE TO RELATED APPLICATION

This application is the National Stage of International Application No. PCT/US2018/032227 filed on May 11, 2018, which claims priority to U.S. Application No. 62/504,787 filed May 11, 2017, the contents of which are hereby incorporated by reference.

FIELD OF THE INVENTION

The present invention relates to a steering column assembly and, more particularly, to a steering column assembly having an adjustable position.

BACKGROUND

Steering column assemblies for vehicles which permit position adjustment, such as by tilting and telescoping of the steering column, are known in the art. Known steering column assemblies include a mounting bracket attached to a vehicle and a steering column movable with respect to the mounting bracket. The steering column assembly has a locking mechanism securing the steering column with respect to the mounting bracket in one of a range of possible positions.

The locking mechanism of known steering column assemblies commonly secures the steering column to the mounting bracket by friction. The materials of the steering column and mounting bracket are selected to improve the frictional force generated between them, however, such materials are expensive and have poor corrosion resistance. Furthermore, adjusting the position of the steering column with respect to the mounting bracket can be physically demanding of a user due to the weight of the steering column.

SUMMARY

The present invention has been made to overcome or alleviate at least one aspect of the above mentioned disadvantages.

A steering column assembly according to the invention comprises a mounting bracket, a steering column, a plurality of friction plates, a plurality of inner spacers, and a locking mechanism. The friction plates are fixed to the steering column and attached to a side of the mounting bracket. The friction plates are movable with respect to the mounting bracket. The inner spacers are interleaved with the plurality of friction plates. Each inner spacer has a scored outer surface. The locking mechanism is operable to press the inner spacers and friction plates together to lock the steering column with respect to the mounting bracket.

BRIEF DESCRIPTION OF THE DRAWINGS

The invention will now be described by way of example with reference to the accompanying figures, of which.

DETAILED DESCRIPTION OF THE EMBODIMENTS

Figure 1:
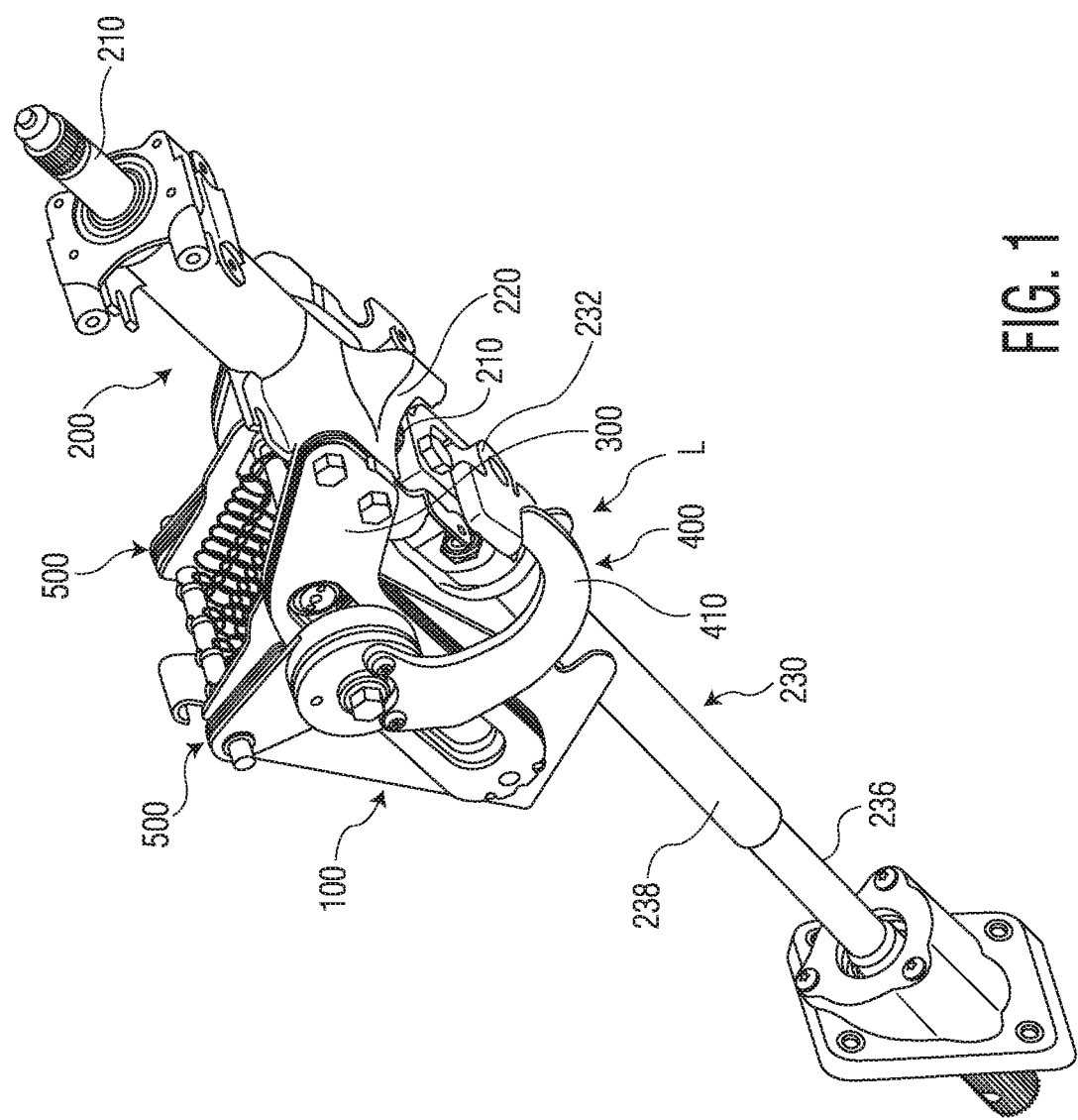
FIG. 1 is a perspective view of a steering column assembly according to the invention.

Exemplary embodiments of the present invention will be described hereinafter in detail with reference to the attached drawings, wherein like reference numerals refer to like elements. The present invention may, however, be embodied in many different forms and should not be construed as being limited to the embodiments set forth herein; rather, these embodiments are provided so that the present disclosure will be thorough and complete, and will fully convey the concept of the disclosure to those skilled in the art.

A steering column assembly according to an embodiment is shown generally in FIG. 1. The steering column assembly includes a mounting bracket 100, a steering column 200, a plurality of friction plates 300, a locking mechanism 400, and a plurality of spacers 500. The major components of the invention will now be described in greater detail.

Figure 2:
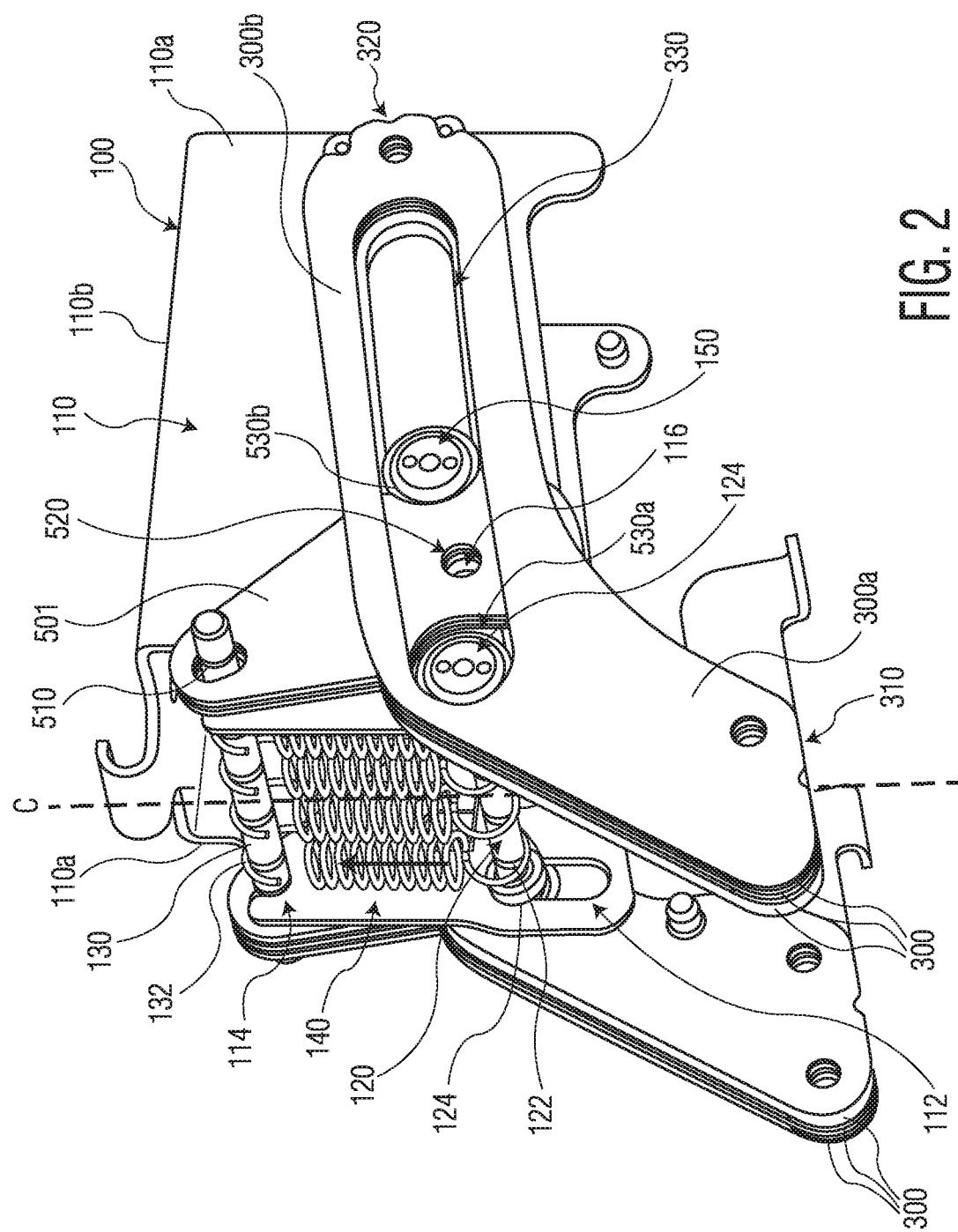
FIG. 2 is a perspective view of a mounting bracket, a plurality of friction plates, and a plurality of spacers of the steering column assembly.

The mounting bracket 100 is shown in FIG. 2. The mounting bracket 100 includes a mounting body 110, a floating pin 120, a plurality of tilt bearings 124, a fixed pin 130, a plurality of extension springs 140, and a plurality of pivot bearings 150.

The mounting body 110, as shown in FIG. 2, has a top surface 110*b*, a pair of side surfaces 110*a*, a pair of tilt slots 112, a fixed pin receiving space 114, and a pair of locking bolt receiving passageways 116.

The pair of side surfaces 110*a*, as shown in FIG. 2, extend from the top surface 110*b* and are parallel to one another. The top surface 110*b* and the pair of side surfaces 110*a* form a U-shape. When the steering column assembly is installed in a vehicle (not shown), the top surface 110b is attached to a frame of the vehicle.

Each tilt slot 112, as shown in FIG. 2, is positioned on one of the pair of side surfaces 110a and has an elongated shape extending through the side surface 110a. In the embodiment shown in FIG. 2, the tilt slots 112 are positioned adjacent an end of each side surface 110a and extend from a side of the side surface 110a distal from the top surface 110b in a direction parallel to a height of the side surface 110a. The tilt slots 112 are symmetrically positioned on the side surfaces 110a about a central axis C of the mounting body 110.

The side surfaces 110a, as shown in FIG. 2, are each shaped to form one fixed pin receiving space 114. The fixed pin receiving spaces 114 are symmetrically positioned about the central axis C and, in the shown embodiment, are an approximately U-shaped side portion of each side surface 110a proximate the top surface 110b. The fixed pin receiving spaces 114 are aligned with the tilt slots 112 in a direction parallel to the central axis C.

Figure 6:
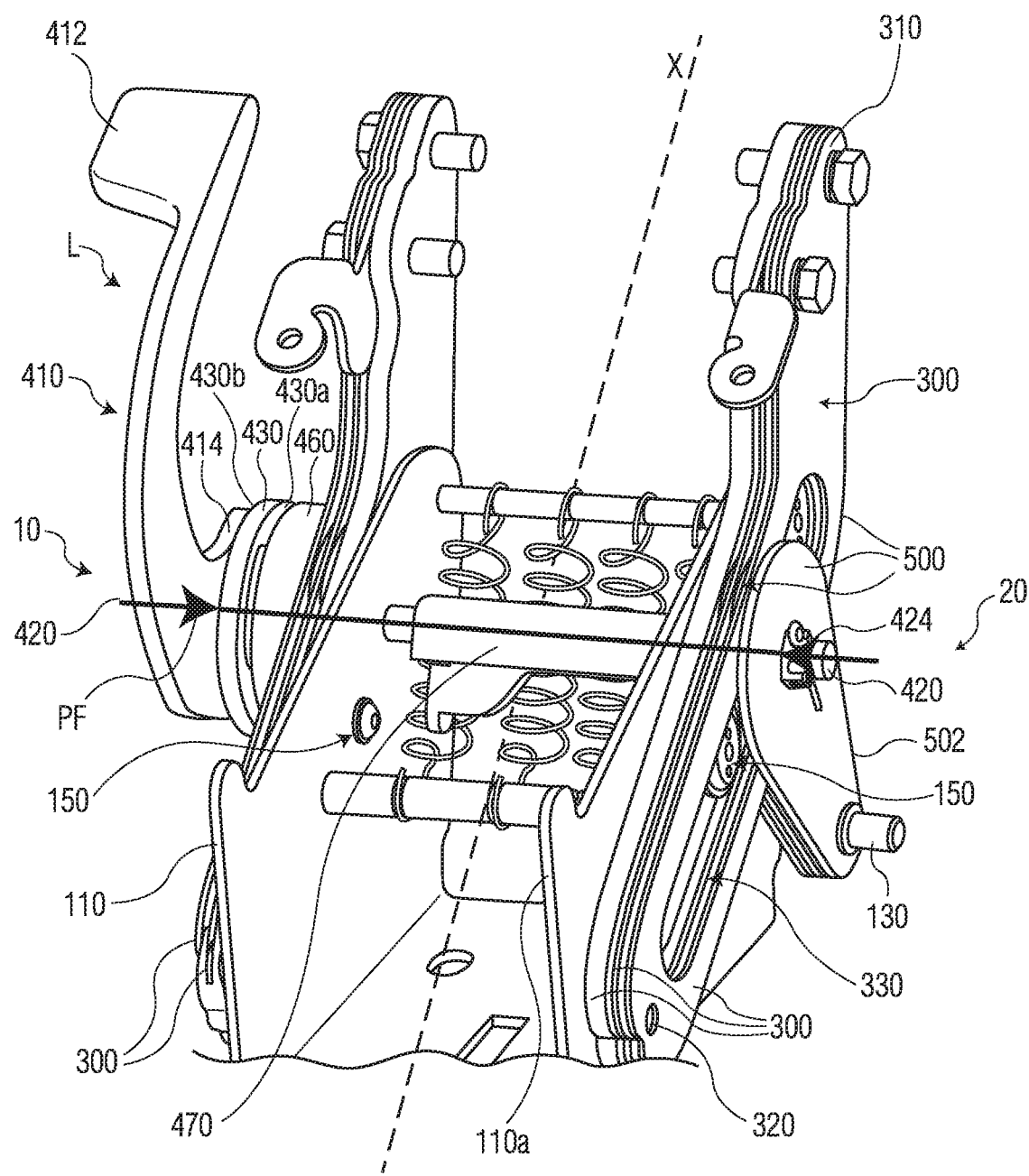
FIG. 6 is a perspective view of a portion of the steering column assembly.

The locking bolt receiving passageways 116 are shown in FIGS. 2 and 6. Each locking bolt receiving passageway 116 is disposed on and extends through one side surface 110a of the mounting body 110. Each locking bolt receiving passageway 116 is adjacent the tilt slot 112 on the respective side surface 110a.

The floating pin 120, as shown in FIG. 2, is an elongated cylindrical member having a plurality of floating pin grooves 132 circumferentially disposed around the floating pin 120. The tilt bearings 124 are disposed on opposite ends of the floating pin 120. The tilt hearings 124 are circular members which are attached to the floating pin 120 such that the tilt bearings 124 can rotate without imparting rotation to the floating pin 120.

Each tilt hearing 124 is disposed in one tilt slot 112 and extends outward from the side surface 110a, as shown in FIG. 2. The floating pin 120 attached to the tilt bearings 124 extends between the tilt slots 112. The tilt bearings 124 are movable along the length of the tilt slots 112 and the floating pin 120 correspondingly moves along the length of the tilt slots 112 in the direction of the central axis C.

The fixed pin 130, as shown in FIG. 2, is an elongated cylindrical member having a plurality of fixed pin grooves 132 circumferentially disposed around the fixed pin 130. The fixed pin 130 is disposed in the fixed pin receiving spaces 114 of the mounting body 110 and extends beyond both side surfaces 110a in a direction transverse to the direction of the central axis C.

The plurality of extension springs 140, as shown in FIG. 2, are attached to the floating pin 120 and the fixed pin 130 and extend between the pins 120, 130. The extension springs 140 may be any type of resilient spring known to those with ordinary skill in the art. A first end of each extension spring 140 is disposed in one of the floating pin grooves 122 and an opposite second end of each extension spring 140 is disposed in one of the fixed pin grooves 132. The extension springs 140 provide an extension spring force EF biasing the floating pin 120 and tilt bearings 124 within the tilt slots 112 in a direction toward the fixed pin 130.

The plurality of pivot bearings 150, as shown in FIGS. 2 and 6, are each fixed approximately centrally on one side surface 110a of the mounting body 110. The pivot bearings 150 are circular members which can rotate with respect to the mounting body 110.

Figure 3:
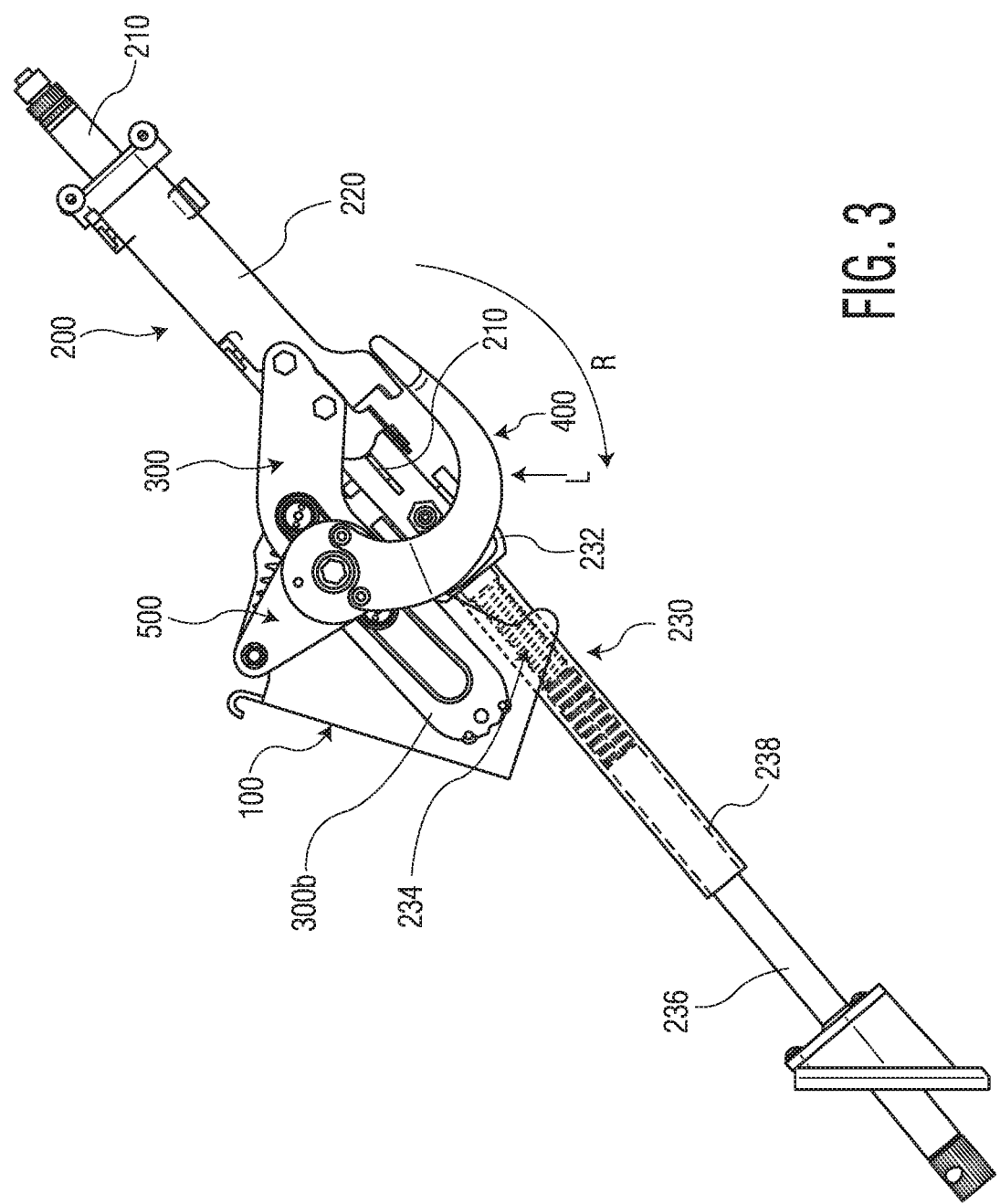
FIG. 3 is a side view of the steering column assembly.
Figure 4:
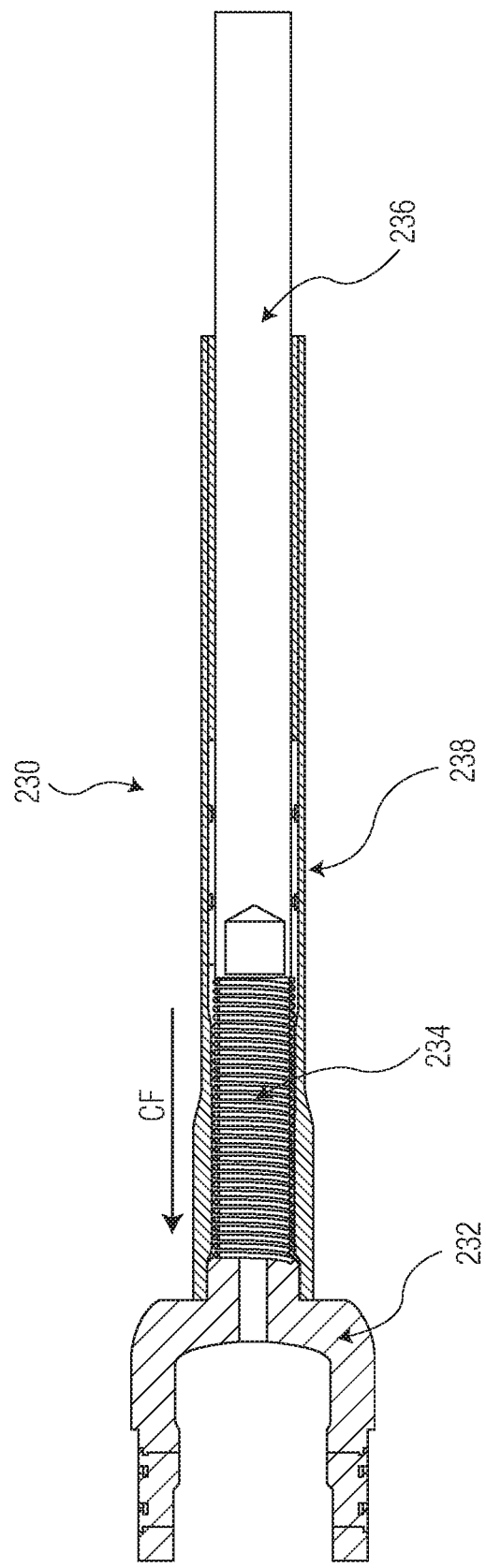
FIG. 4 is a top view of an intermediate column shaft of a steering column of the steering column assembly.

The steering column 200 is shown in FIGS. 1, 3, and 4. The steering column 200 includes an input shaft 210, an upper column housing 220, and an intermediate column shaft 230.

The input shaft 210, as shown in FIGS. 1 and 3, is disposed in the upper column housing 220. The input shaft 210 is connected to a steering wheel (not shown) and is rotatable within the upper column housing 220.

The intermediate column shaft 230 is shown in FIGS. 1, 3, and 4 and includes a yoke 232, a column spring 234, a slider shaft 236, and a slider tube 238. As shown in FIGS. 1 and 3, the yoke 232 is connected to the input shaft 210. The yoke 232, as shown in FIG. 4, is fixed to the slider tube 238 within which the column spring 234 and the slider shaft 236 are disposed. The slider shaft 236 is movable within the slider tube 238 and with respect to the yoke 232 along a longitudinal direction of the slider shaft 236. Rotation of the input shaft 210 imparts rotation to the yoke 232, which imparts rotation to the slider shaft 236. The column spring 234 is disposed at a connection between the slider shaft 236 and the yoke 232; as the yoke 232 and slider tube 238 move longitudinally with respect to the slider shaft 236, the column spring 234 provides a column spring force CF biasing the yoke 232 and slider shaft 236 in a longitudinal direction away from one another.

The plurality of friction plates 300 are shown in FIGS. 1 and 2. Each friction plate 300 is an arcuate member monolithically formed by a straight first section 300a and a straight second section 300b extending between a first end 310 and an opposite second end 320. The first section 300a and the second section 300b are disposed at an angle with respect to each other. The friction plate 300 has a substantially linear and elongated friction plate slot 330 extending through the second section 300b. In an embodiment, each of the plurality of friction plates 300 is a zinc-plated metal material.

Figure 5:
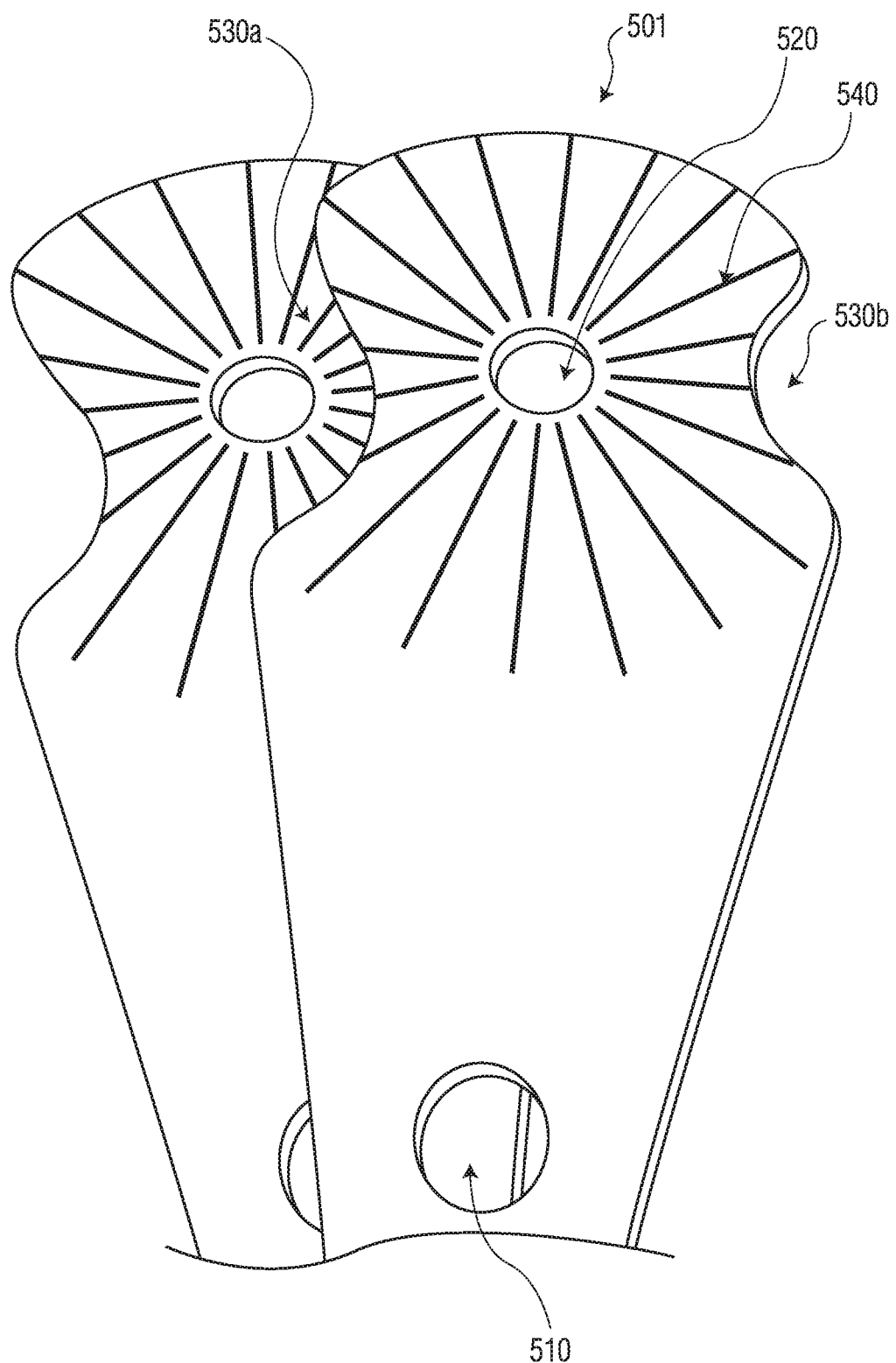
FIG. 5 is a front view of an inner spacer of the plurality of spacers of FIG. 2.

The plurality of spacers 500 are shown in FIGS. 1, 5, and 6. Each spacer 500 is an elongated arcuate member. The spacer 500 has a fixed pin receiving passageway 510 disposed at a first end and extending through the spacer 500 and a locking bolt receiving passageway 520 disposed adjacent an opposite second end and extending through the spacer 500. In an embodiment, each of the spacers 500 is a zinc-plated metal material.

The spacers 500 include inner spacers 501 and outer spacers 502, as shown in FIGS. 5 and 6. The inner spacers 501, as shown in FIG. 5, have an exterior profile including a pair of recesses 530a, 530b disposed symmetrically about the locking bolt receiving passageway 520. The recesses 530a, 530b include a large recess 530a disposed on a first side of the inner spacer 501 and a small recess 530b disposed on an opposite second side of the inner spacer 501. The inner spacers 501 have a pair of scored outer surfaces 540 formed by any scoring technique known to those with ordinary skill in the art. The outer spacers 502, as shown in FIG. 6, have an outer profile without the recesses 530a, 530b. In the shown embodiment, outer surfaces of the outer spacers 502 are not scored.

The locking mechanism 400 is shown in FIGS. 1 and 6-9. The locking mechanism 400 includes a locking lever 410, a locking bolt 420, a clamp plate 430, a plurality of ball bearings 450, a bearing member 460, and a brace 470, The locking lever 410 is shown in FIGS. 1 and 6. The locking lever 410 is a curved member having a locking handle 412 on a first end and extending to a fastening end 414 at an opposite second end. The fastening end 414 is fastened to the clamp plate 430 such that rotation of the locking lever 410 rotates the clamp plate 430.

Figure 7:
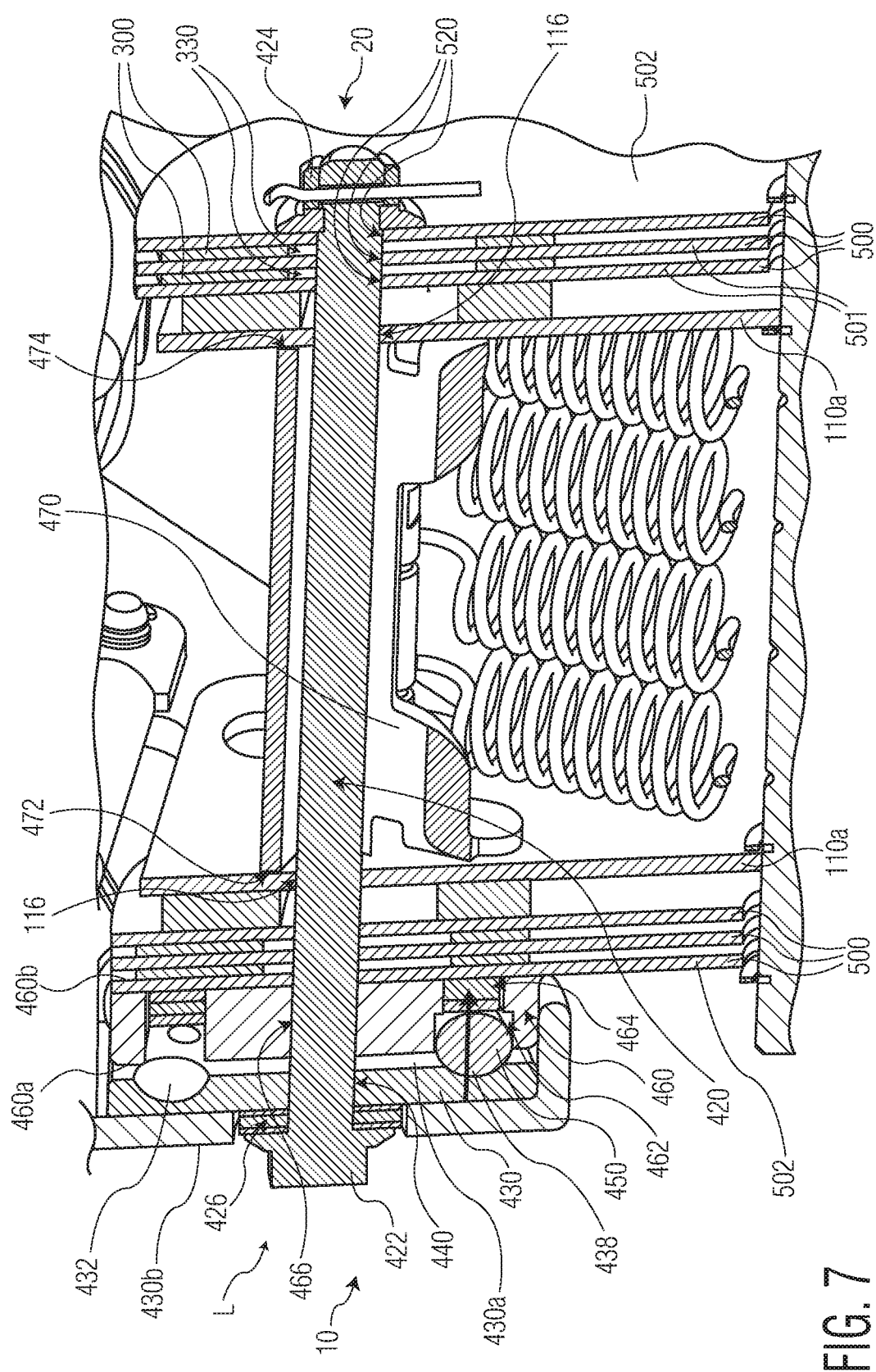
FIG. 7 is a sectional perspective view of the steering column assembly.

The locking bolt 420, as shown in FIGS. 6 and 7, is an elongated cylindrical member having a flange 422 at a first end and a fastener 424 at an opposite second end. In the shown embodiment, the locking bolt 420 has a plurality of bolt washers 426 disposed adjacent the flange 422.

Figure 8:
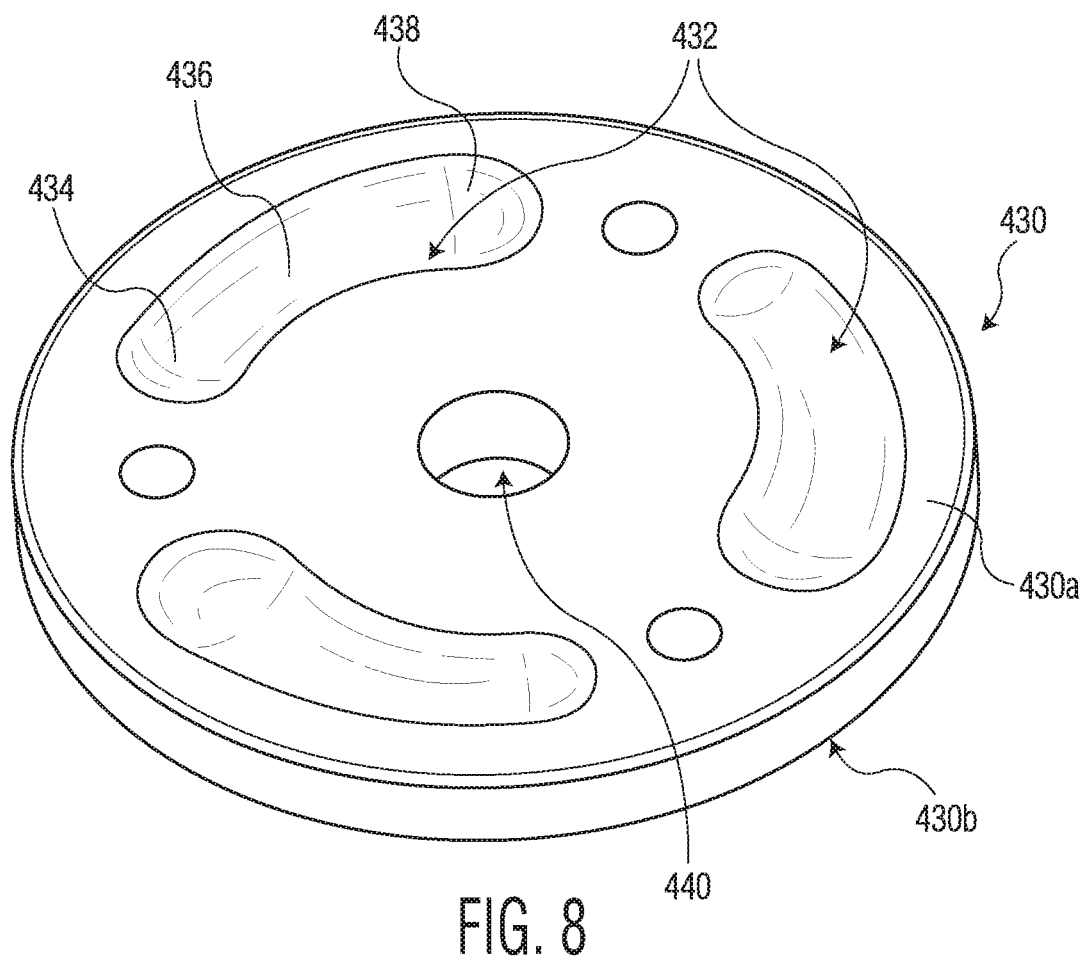
FIG. 8 is a perspective view of a clamp plate of a locking mechanism of the steering column assembly.

The clamp plate 430 is shown in FIGS. 6-9. As shown in FIG. 8, the clamp plate 430 is a disc-shaped member having a first surface 430*a* and an opposite second surface 430*b*. The clamp plate 430 has a locking bolt receiving passageway 440 extending approximately centrally through the clamp plate 430 and a plurality of graduated channels 432 disposed in and extending along the first surface 430*a*.

Figure 9:
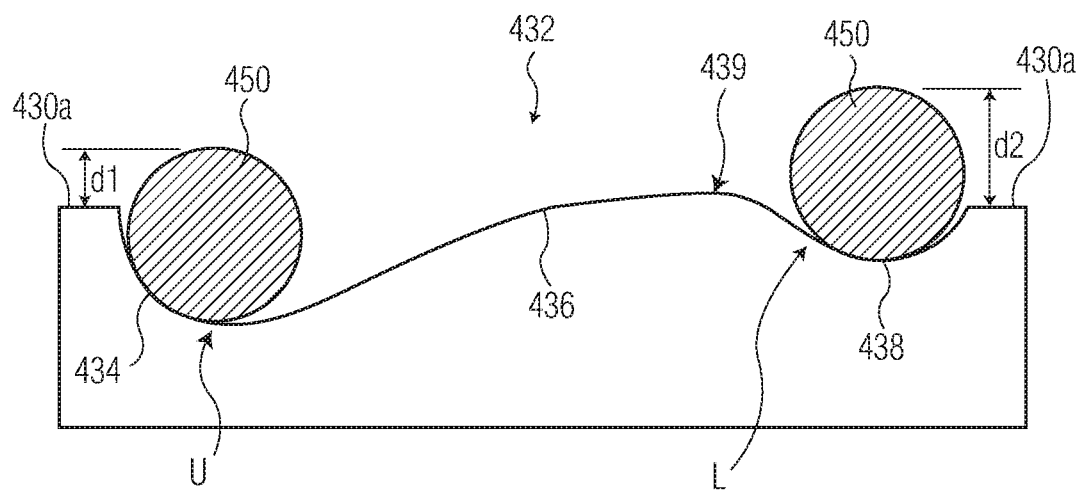
FIG. 9 is a sectional side view of the clamp plate of FIG. 8.

Each of the graduated channels 432, as shown in FIG. 9, is variably sloped, having a cup-shaped first channel seat 434 at a first end, a cup-shaped second channel seat 438 at an opposite second end, and a sloped surface 436 extending between the first channel seat 434 and the second channel seat 438. The first channel seat 434 is a deepest portion of the graduated channel 432; the first channel seat 434 is a portion of the channel 432 positioned furthest apart from the first surface 430*a*. The sloped surface 436 is sloped such that a depth from the first surface 430*a* decreases from the first channel seat 434 to a shallowest point 439 positioned between the first channel seat 434 and the second channel seat 438. The depth of the sloped surface 436 from the first surface 430*a* increases slightly from the shallowest point 439 to form the second channel seat 438.

The plurality of ball bearings 450 are shown in FIGS. 7 and 9. Each of the ball bearings 450 is spherical.

The hearing member 460 is shown in FIGS. 6 and 7, The bearing member 460 is disc-shaped and has a first surface 460*a*, an opposite second surface 460*b*, a ball bearing receiving passageway 462, a plurality of bearing materials 464, and a locking bolt receiving passageway 466. The ball bearing receiving passageway 462 extends into the first surface 460*a*. In the shown embodiment, the hearing materials 464 are disposed in the ball bearing receiving passageway 462. The locking bolt receiving passageway 466 extends approximately centrally through the bearing member 460.

The brace 470 is shown in FIGS. 6 and 7. The brace 470 is integrally formed and includes a first bracing surface 472 at a first end of the brace 470 and a second bracing surface 474 at an opposite second end of the brace 470. A length of the brace 470 between the first bracing surface 472 and the second bracing surface 474, in a direction extending along the locking bolt 420, is equal to a distance between the pair of side surfaces 110*a* of the mounting body 110.

The connection of the mounting bracket 100 to the steering column 200 via the plurality of friction plates 300, the locking mechanism 400, and the plurality of spacers 500 to form the steering column assembly will now be described in greater detail with reference to FIGS. 1-3, 6, and 7. The steering column assembly, as shown in FIGS. 6 and 7, has a locking side 10 and an opposite fastening side 20.

The upper column housing 220, as shown in FIGS. 1, 3, and 6, is attached to the friction plates 300. The friction plates 300 are disposed in two sets. In the shown embodiment, the steering column assembly has six friction plates 300 with two sets of three friction plates 300, the sets of friction plates 300 symmetrically attached to opposite sides of the upper column housing 220. One with ordinary skill in the art would understand that the number of friction plates 300 may vary within the scope of the invention.

On each side of the upper column housing 220, as shown in FIG. 6, the first ends 310 of the friction plates 300 are fixed to the upper column housing 220 by a plurality of fasteners, for example, bolts. The friction plates 300 of one set on each side of the upper column housing 220 are layered such that the friction plate slots 330 are aligned. The second section 300*b* of each friction plate 300, as shown in FIG. 3, extends in a direction away from the upper column housing 220 and approximately parallel to a longitudinal direction of the upper column housing 220.

As shown in FIG. 6, the spacers 500 are interleaved with the friction plates 300. Similarly to the friction plates 300, the spacers 500 are disposed in two sets, with a first set of spacers 500 interleaved with the first set of friction plates 300 and a second set of spacers 500 interleaved with the second set of friction plates 300. Each set of spacers 500 includes one outer spacer 502 and the remainder as inner spacers 501. In the shown embodiment, the steering column assembly has six spacers 500 with each set having three spacers 500. One with ordinary skill in the art would understand that the number of spacers 500 may vary within the scope of the invention.

The friction plates 300 and spacers 500 connect the steering column 200 to the mounting bracket 100. As shown in FIGS. 6 and 7, each set of friction plates 300 and spacers 500 is disposed on either the locking side 10 or the fastening side 20 of the steering column assembly. The friction plates 300 and spacers 500 are symmetrical about a longitudinal axis X of the mounting bracket 100 on each side surface 110*a* at the locking side 10 and the fastening side 20; only the arrangement of the friction plates 300 and spacers 500 with respect to one side surface 100*a* will be described herein.

As shown in FIGS. 2, 6, and 7, each set of friction plates 300 is disposed adjacent one side surface 110*a*, and the tilt bearing 124 and pivot bearing 150 on said side surface 110*a* are disposed in the friction plate slots 330. The friction plate slots 330 can move lengthwise along the tilt bearing 124 and the pivot bearing 150.

The spacers 500 are interleaved with the friction plates 300 and, as shown in FIG. 7, the locking bolt receiving passageway 520 of each spacer 500 is aligned with the friction plate slots 330 and the locking bolt receiving passageway 116 of the side surface 110*a*. As shown in FIG. 2, the fixed pin 130 extends through the fixed pin receiving passageway 510 of each spacer 500 to secure the spacers 500 to the mounting bracket 100. The tilt bearing 124 is disposed in the large recess 530*a* of each inner spacer 501 and the pivot bearing 150 is disposed in the small recess 530*b* of each inner spacer 501. As shown in FIGS. 6 and 7, the outer spacer 502 of each spacer 500 set is disposed adjacent to an outer surface of an outermost friction plate 300. The scored outer surfaces 540 of the inner spacers 501 abut the friction plates 300.

The locking mechanism 400 secures the friction plates 300 and spacers 500 to the mounting bracket 100. As shown in FIGS. 6 and 7, the fastening end 414 of the locking lever 410 is attached to the second surface 430*b* of the clamp plate 430. The bearing members 460 are disposed in the graduated channels 432 and are disposed between the first surface 430*a* of the clamp plate 430 and the bearing member 460. As shown in FIG. 7, the bearing member 460 is disposed adjacent the outer spacer 502 on the locking side 10 of the steering column assembly. In the shown embodiment, the bearing member 460 is integrally formed with the outer spacer 502. In other embodiments, the bearing member 460 and the outer spacer 502 are separately formed and attached to one another.

As shown in FIG. 7, the locking bolt receiving passageway 440 of the clamp plate 430 is aligned with the locking bolt receiving passageway 466 of the bearing member 460, the locking bolt receiving passageways 520 of the spacers 500 on the locking side 10 and the fastening side 20, the friction plate slots 330 on the locking side 10 and the fastening side 20, and the locking bolt receiving passageways 116 of the side surfaces 110*a* on the locking side 10 and the fastening side 20. The locking bolt 420 is inserted through these passageways. The flange 422 of the locking bolt 420 abuts the second surface 430*b* of the clamp plate 430 and is secured exterior of the outer spacer 502 on the fastening side 20 by the fastener 424. The locking bolt 420 holds the side surfaces 110*a*, friction plates 300, spacers 500, bearing member 460, and clamp plate 430 together. In the embodiment shown in FIG. 7, the bolt washers 426 are disposed between the flange 422 and the second surface 430*b* of the clamp plate 430.

The brace 470, as shown in FIG. 7, at least partially surrounds a portion of the locking bolt 420 disposed between the side surfaces 110*a*. The first bracing surface 472 abuts a first of the pair of side surfaces 110*a* and the second bracing surface 474 abuts a second of the pair of side surfaces 100*a*.

The use of the steering column assembly will now be described in greater detail with reference to FIGS. 1, 3, 6, 7, 9, 10.

The locking handle 412 is rotatable in a direction R shown in FIG. 3 to move the locking mechanism 400 between a locked position L and an unlocked position U. The locking handle 412 is shown in the locked position L in FIGS. 1, 3, 6, and 7.

As shown in FIG. 9, in the unlocked position U, the ball bearing 450 is positioned in the first channel seat 434 of the clamp plate 430. The ball bearing 450 protrudes beyond the first surface 430*a* of the clamp plate 430 by a first distance d1 when positioned in the first channel seat 434. The first distance d1 is less than or equal to a depth of the ball bearing receiving passageway 462 in the unlocked position U, the first surface 430*a* abuts the bearing member 460.

As the locking handle 412 is rotated between the unlocked position U and the locked position L, the locking lever 410 rotates the clamp plate 430. As shown in FIG. 7, the ball bearing 450 in each graduated channel 432 is engaged with the ball bearing receiving passageway 462 of the bearing member 260 and rolls in place during rotation of the clamp plate 430. The ball bearing 450 thus moves along the sloped surface 436 as the clamp plate 430 is rotated by the locking lever 410.

The ball bearing 450, as shown in FIG. 9, passes the shallowest point 439 of the sloped surface 436 and is positioned in the second channel seat 438 when the locking lever 410 is fully rotated from the unlocked position U to the locked position L. The ball bearing 450 protrudes beyond the first surface 430*a* of the clamp plate 430 by a second distance d2 larger than the first distance d1 when positioned in the second channel seat 438. The second distance d2 is also larger than the depth of the ball bearing receiving passageway 462, and consequently, when the ball bearing 450 is in the second channel seat 438, the ball bearing 450 imparts a normal force PF shown in FIGS. 6 and 7 separating and pushing the bearing member 460 away from the clamp plate 430.

The normal force PF shown in FIGS. 6 and 7 compresses the friction plates 300, the spacers 500, and the side surfaces 110*a* between the bearing member 460 and the fastener 424 against the first bracing surface 472 and the second bracing surface 474 of the brace 470. The normal force PF, along with the scored outer surfaces 540 of the inner spacers 501, creates friction sufficient to prevent movement of the friction plates 300 with respect to the mounting bracket 100. Scoring the scored outer surfaces 540 of the inner spacers 501 creates a sufficiently high coefficient of friction on the inner spacers 501 to permit the use of less expensive materials for the spacers 500 and the friction plates 300. In the locking position L shown in FIGS. 6 and 7, the position of the steering column 200 attached to the friction plates 300 is fixed with respect to the mounting bracket 100.

The locking lever 110 is rotated back to the unlocked position U to remove the normal force PF and permit movement of the steering column 200 and friction plates 300 with respect to the mounting bracket 100. The steering column 200, via the friction plates 300, is capable of tilting and telescoping with respect to the mounting bracket 100 as shown in FIGS. 10A-10D to permit a variety of steering column 200 adjustment positions. The steering column 200 attached to the friction plates 300 is not shown in FIGS. 10A-10D to simplify the depiction in the drawings.

Figure 10A:
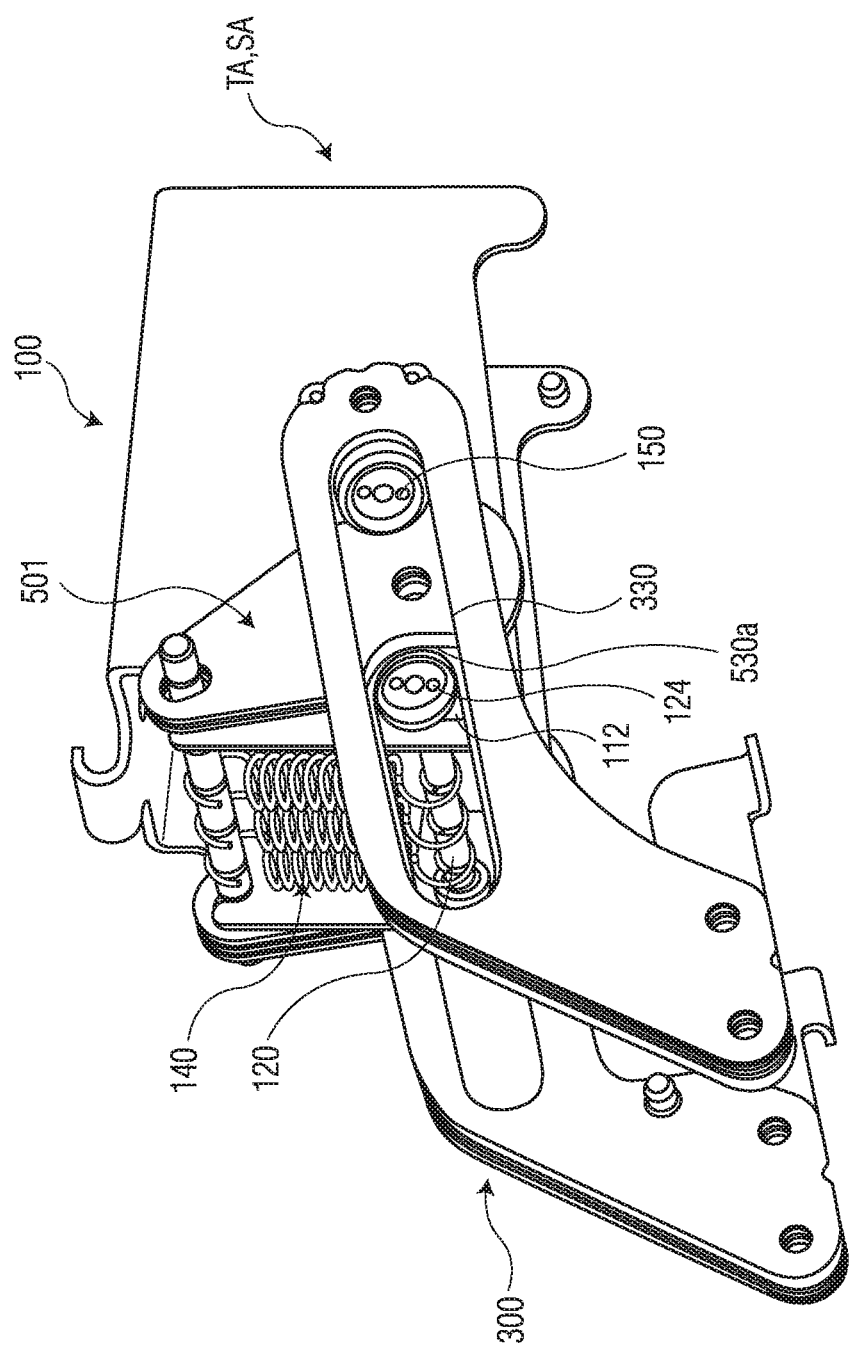
FIG. 10A is a perspective view of the mounting bracket, the plurality of friction plates, and the plurality of spacers of FIG. 2 in an upper tilt position and an extended telescope position.
Figure 10B:
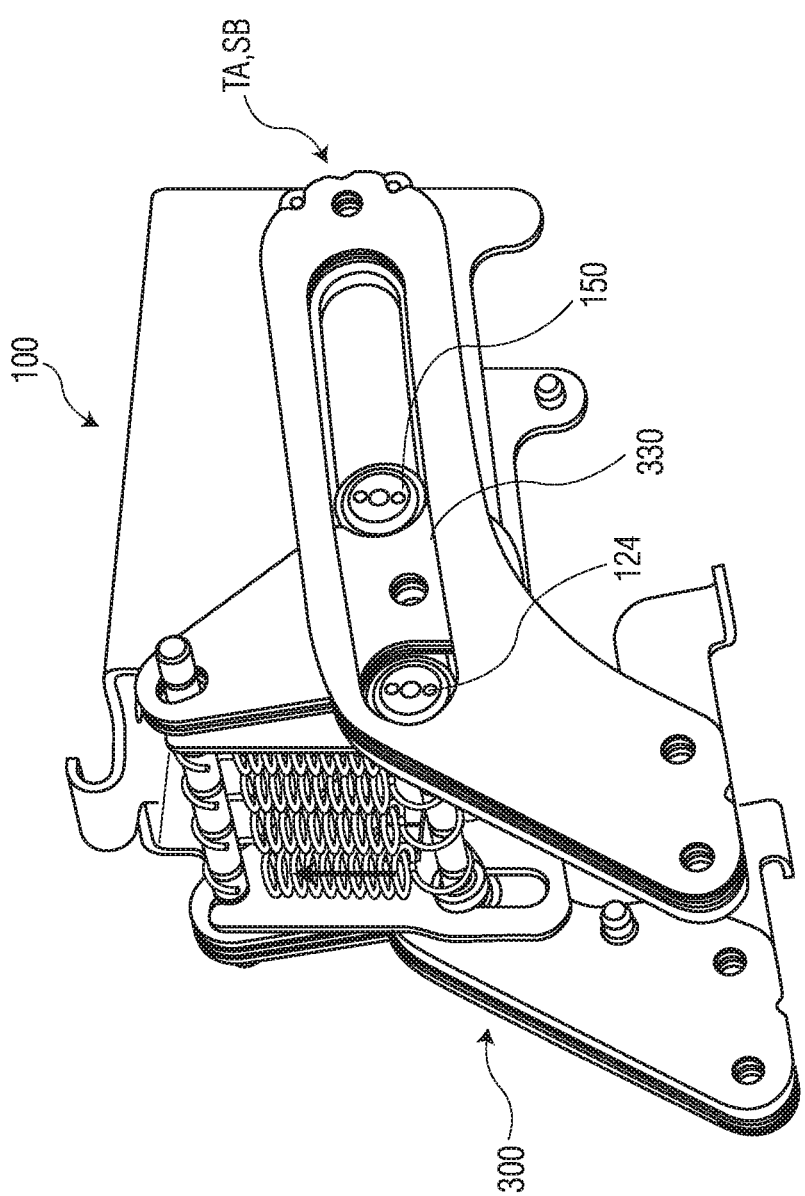
FIG. 10B is a perspective view of the mounting bracket, the plurality of friction plates, and the plurality of spacers of FIG. 2 in the upper tilt position and a retracted telescope position.
Figure 10C:
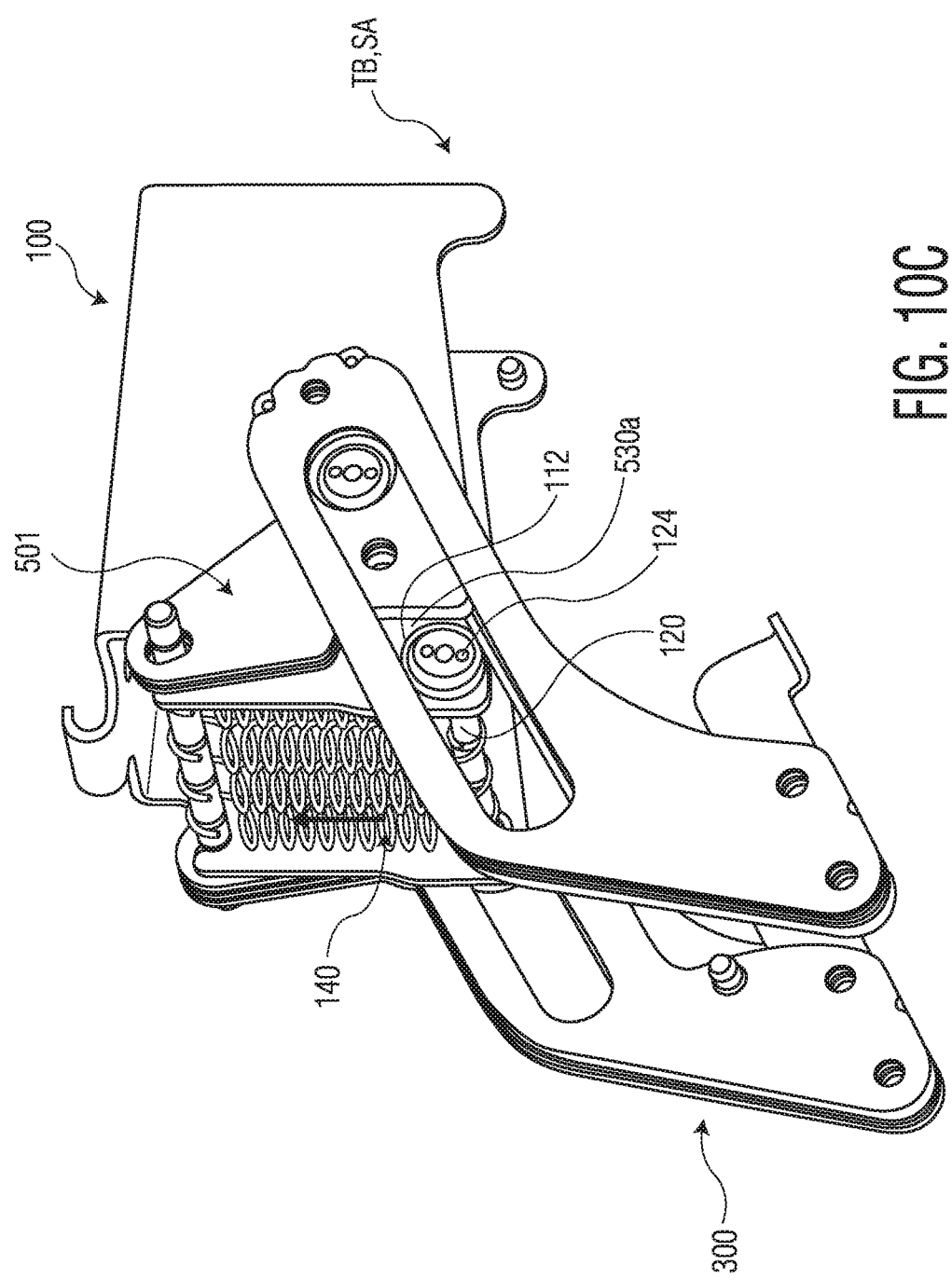
FIG. 10C is a perspective view of the mounting bracket, the plurality of friction plates, and the plurality of spacers of FIG. 2 in a lower tilt position and the extended telescope position.
Figure 10D:
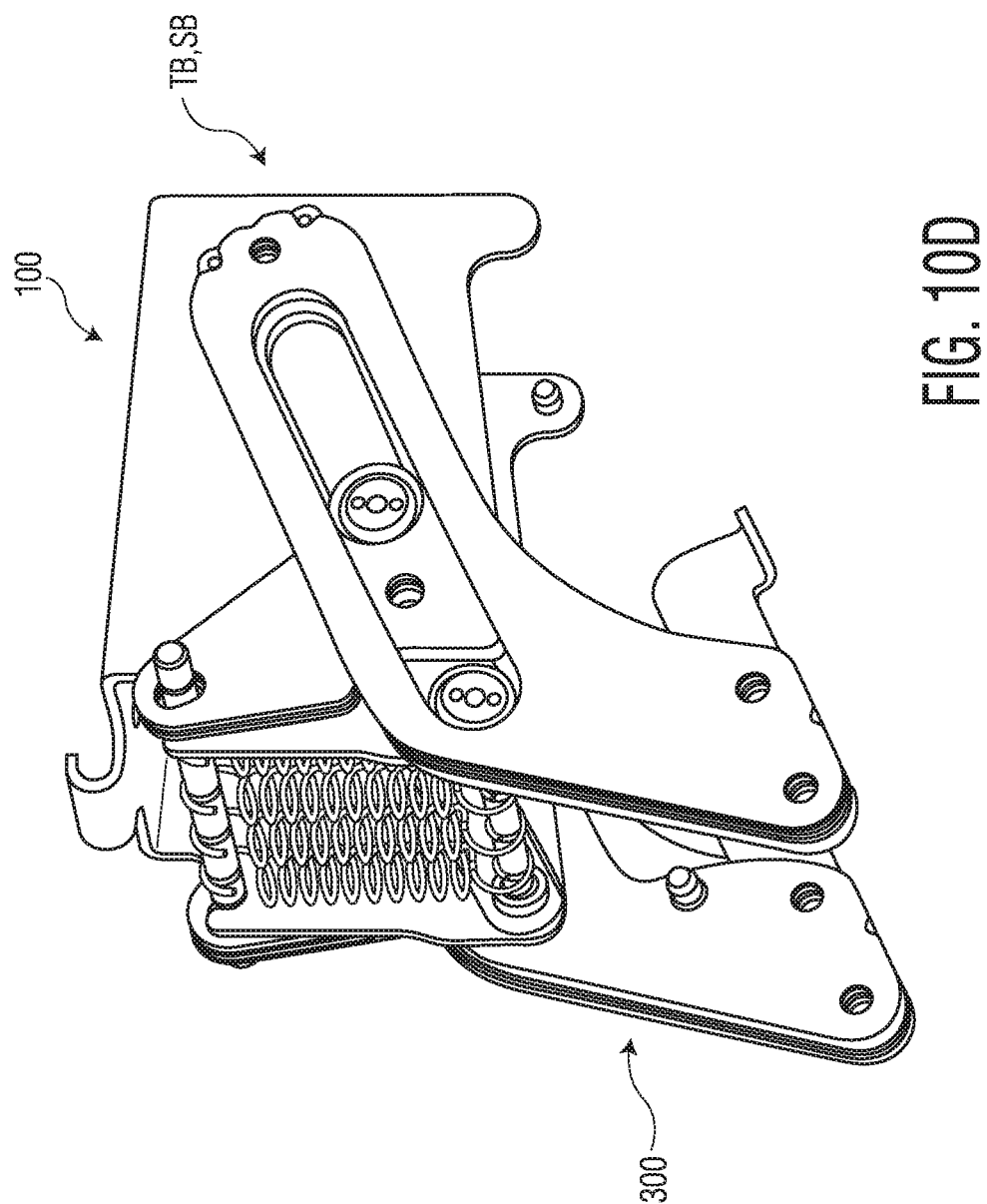
FIG. 10D is a perspective view of the mounting bracket, the plurality of friction plates, and the plurality of spacers of FIG. 2 in the lower tilt position and the retracted telescope position.

The friction plates 300 can telescope with respect to the mounting bracket 100 between an extended telescope position SA shown in FIGS. 10A and 10C and a retracted telescope position SB shown in FIGS. 10B and 10D. A plurality of possible telescope positions exist between the extended telescope position SA and the retracted telescope position SB.

To move the steering column 200 between the extended telescope position SA and the retracted telescope position SB, the steering column 200 is either pushed in a direction toward the mounting bracket 100 or pulled in an opposite direction away from the mounting bracket 100. The tilt bearings 124 and the pivot bearings 150 move along the friction plate slots 330 during telescoping motion. Further, during telescoping motion, the yoke 232 and the slider tube 238 are moved with respect to the slider shaft 236 shown in FIGS. 3 and 4. The column spring force CF of the column spring 234 increasingly biases the steering column 200 toward the extended telescope position SA as the column spring 234 is compressed. The column spring force CF acts counter to the force of gravity on the steering column 200, preventing the steering column 200 from falling into the retracted telescope position SB and easing telescoping movement of the steering column 200.

The friction plates 300 can tilt with respect to the mounting bracket 100 between an upper tilt position TA shown in FIGS. 10A and 10B and a lower tilt position TB shown in FIGS. 10C and 10D. A plurality of possible tilt positions exist between the upper tilt position TA and the lower tilt position TB.

To move the steering column 200 between the upper tilt position TA and the lower tilt position TB, the steering column 200 is either moved in an upward direction or an opposite downward direction with respect to the mounting bracket 100. The tilt bearings 124 and the attached floating pin 120 move along the tilt slots 112 during tilting motion; the large recess 530*a* of the spacer 500 permits the tilt bearing 124 to move relative to the inner spacer 501. As the steering column 200 is tilted toward the lower tilt position TB during tilting motion, the extension springs 140 impart the increasing extension spring force EF biasing the steering column 200 toward the upper tilt position TA. The extension spring force EF acts counter to the force of gravity on the steering column 200, preventing the steering column 200 from falling into the lower tilt position TB and easing tilting movement of the steering column 200.

As shown in FIGS. 10A-10D, the steering column 200 attached to the friction plates 300 has a multitude of possible adjustment positions with respect to the mounting bracket 100 combining a tilt position between the upper tilt position TA and the lower tilt position TB and a telescope position between the extended telescope position SA and the retracted telescope position SB. When the desired adjustment position is reached, the locking lever 410 is actuated to move the locking mechanism 400 from the unlocked position U to the locked position L, securing the steering column 200 in the desired adjustment position.

A steering column assembly according to another embodiment is shown in FIGS. 11-14. Like reference numbers indicate like elements and only the differences with respect to the embodiment of the steering column assembly shown in FIGS. 1-10D will be described in detail herein. In the embodiment shown in FIGS. 11-14, a locking mechanism 400' of the steering column assembly includes the locking lever 410, the locking bolt 420, the clamp plate 430, the plurality of ball bearings 450, the bearing member 460, and a clamp mechanism 480; the locking mechanism 400' includes the clamp mechanism 480 in lieu of the brace 470.

Figure 12:
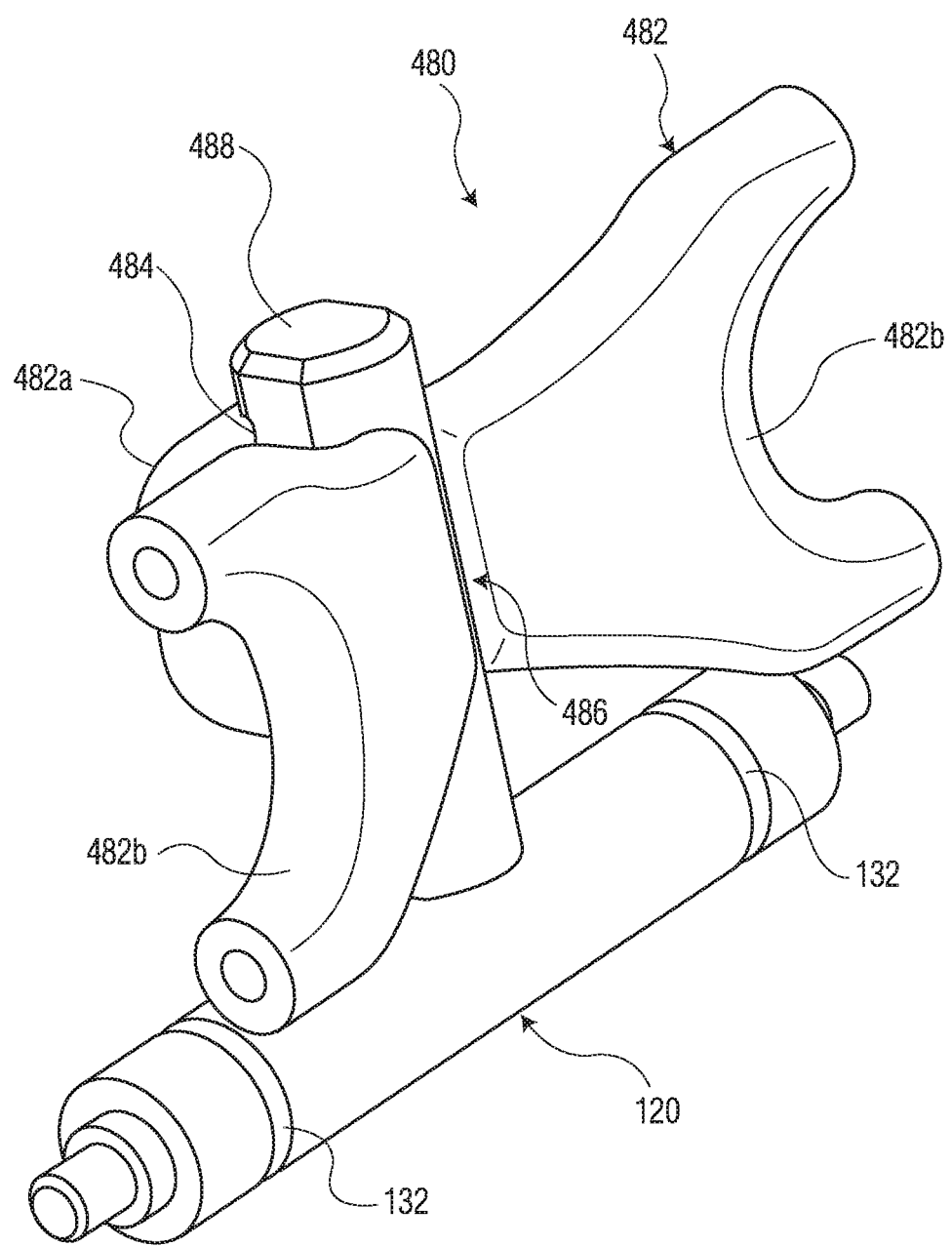
FIG. 12 is a perspective view of a clamping mechanism of the steering column assembly of FIG. 11.

The clamp mechanism 480, as shown in FIG. 12, includes a clamp member 482 and a clamp post 488 extending through the clamp member 482. The clamp member 482 has a central section 482a and a pair of side sections 482b, each side section 482b extends from an opposite end of the central section 482a in a direction away from the other side section 482b. In the shown embodiment, the central section 482a is U-shaped and each of the side sections 482b is Y-shaped. In an embodiment, the clamp member 482 is integrally formed from a resilient material, such as aluminum.

The central section 482a and side sections 482b define a clamp post receiving passageway 484 as shown in FIG. 12. The clamp post 488 is an approximately cylindrical post that is positioned in and extends through the clamp post receiving passageway 484. The clamp member 482 surrounds nearly an entire circumference of the clamp post 488 at the clamp post receiving passageway 484 except for a clamp member gap 486 by which the side sections 482b are spaced apart at the ends of the side sections 482b connected to the central section 482a.

Figure 13:
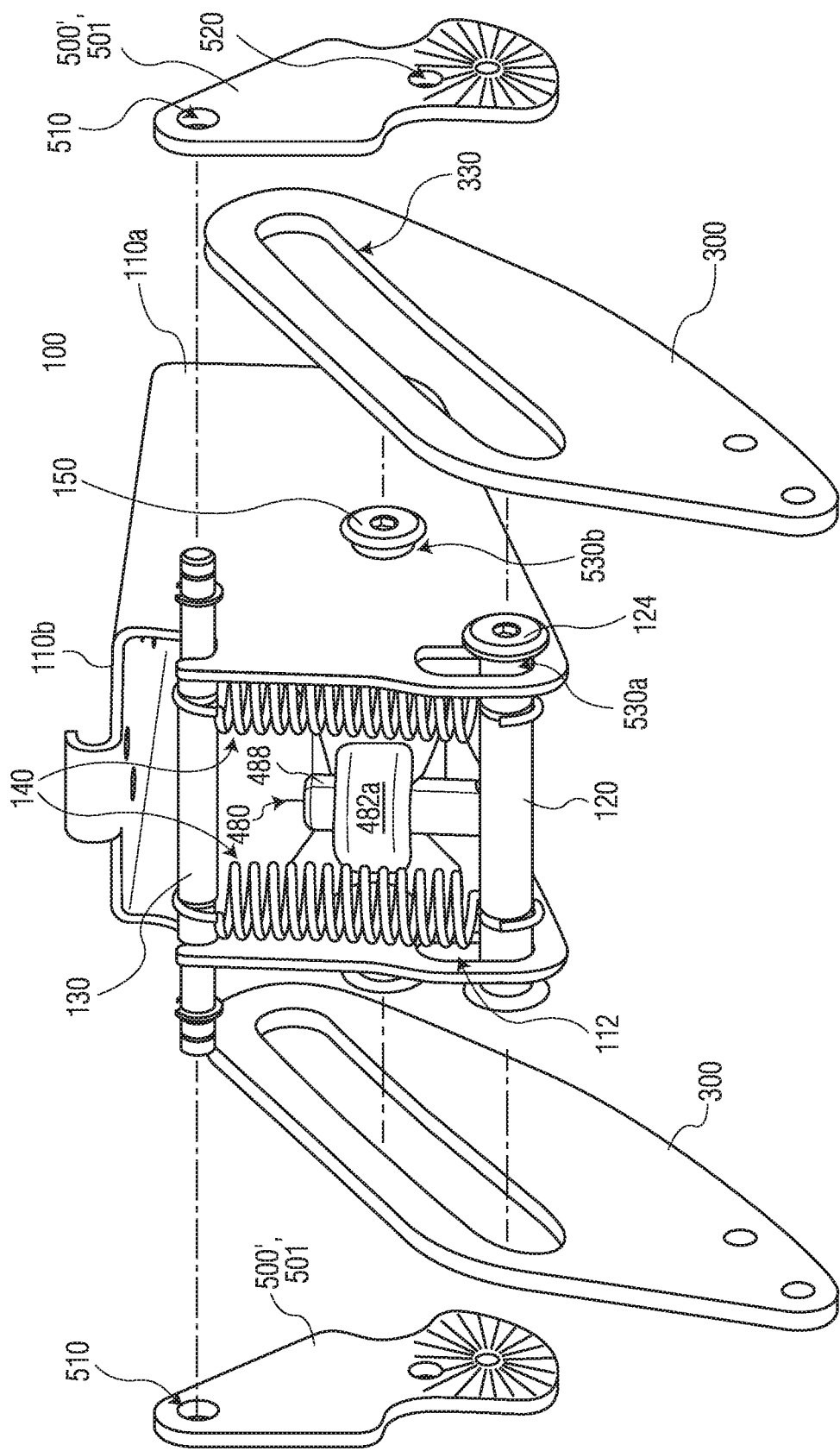
FIG. 13 is a perspective view of the clamping mechanism, a mounting bracket, a plurality of friction plates, and a plurality of spacers of the steering column assembly of FIG. 11.
Figure 14:
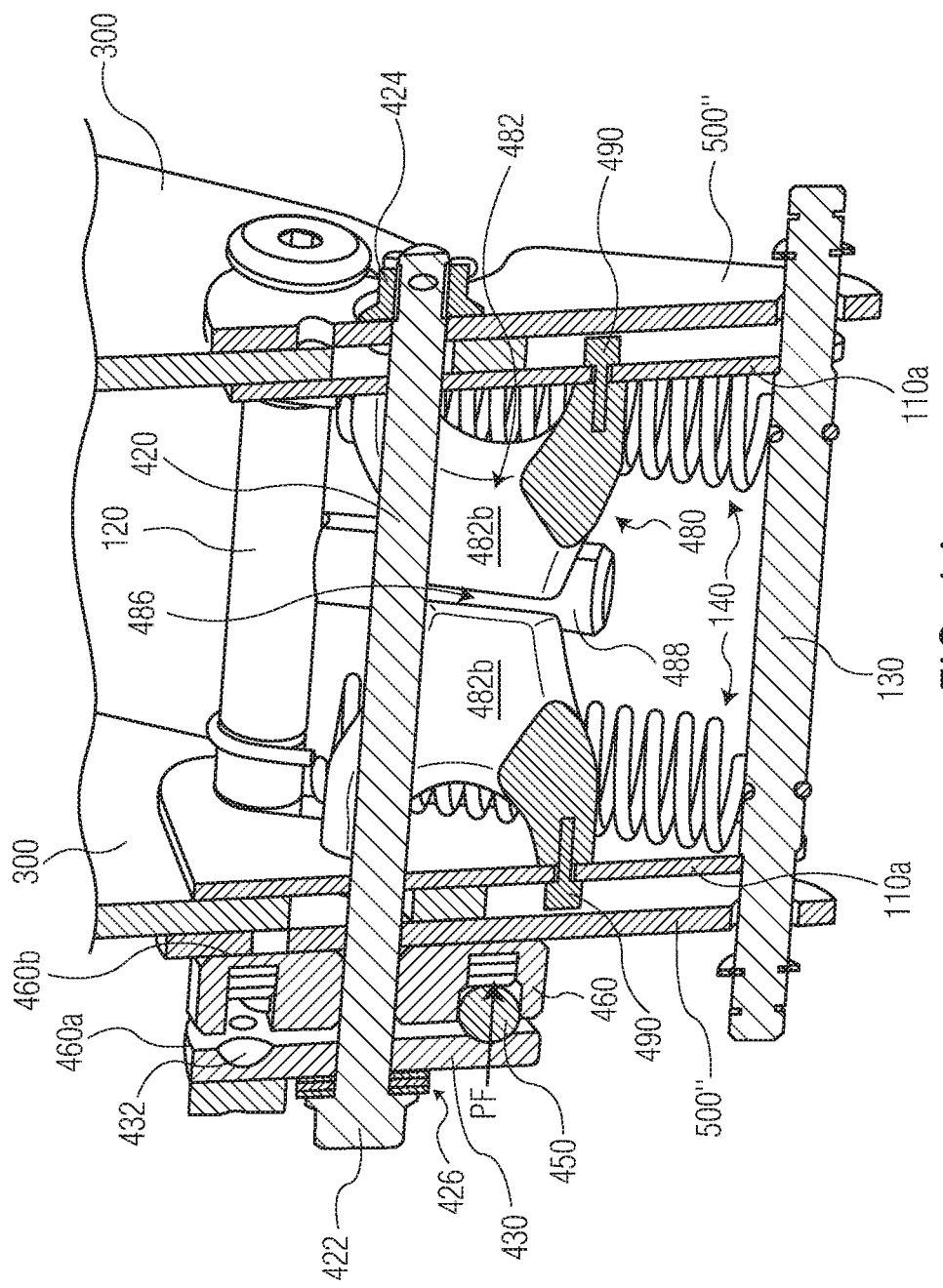
FIG. 14 is a sectional perspective view of the steering column assembly of FIG. 11.

The clamp mechanism 480 is shown attached to the mounting bracket 100 with the plurality of friction plates 300 and the plurality of spacers 500 in FIG. 13 and is shown attached to the mounting bracket 100 with the plurality of friction plates 300, the plurality of spacers 500, and the locking mechanism 400' in FIG. 14.

Figure 11:
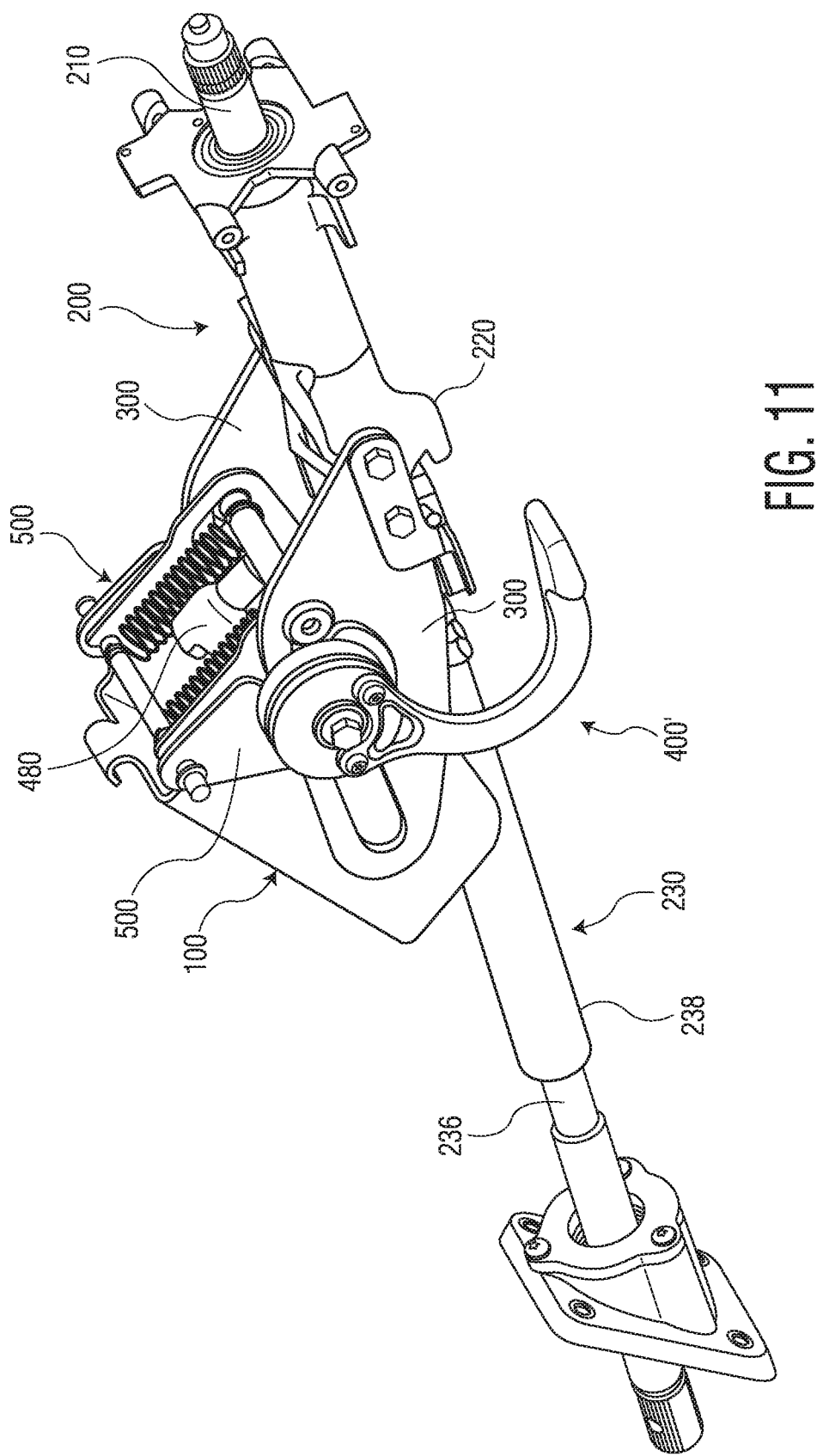
FIG. 11 is a perspective view of a steering column assembly according to another embodiment.

In the steering column assembly embodiment shown in FIGS. 11, 13, and 14, the mounting bracket 100 includes only two extensions springs 140 attached between the pins 130, 140 to accommodate the clamp mechanism 480. The function and use of the extension springs 140 is otherwise unchanged from the embodiment described above with reference to FIGS. 1-10D.

In the steering column assembly embodiment shown in FIGS. 11, 13, and 14, the plurality of friction plates 300 include only two friction plates 300 with one friction plate 300 disposed on each side of the mounting body 110. The plurality of spacers 500 include only two spacers 500 with one spacer 500 disposed on each side of the mounting body 110. On each side of the mounting body 110, the spacer 500 is disposed exterior of the friction plate 300. As shown in the embodiment of FIG. 13, each spacer 500' is an inner spacer 501, described above and shown in FIG. 5, having a scored outer surface 540 facing. the adjacent friction plate 300. In other embodiments, as shown in FIG. 14, each of the spacers 500" has the shape of inner spacers 501 described above but is not scored on either outer surface.

As shown in FIGS. 13 and 14, the clamp member 482 is attached to both of the side surfaces 110a of the mounting body 110 and is positioned between the side surfaces 110a. In the shown embodiment, a plurality of clamp fasteners 490 extend through each of the side surfaces 110a and attach to an end of each of the side sections 482b opposite the central section 482a. The clamp member 482 is fixed to the mounting body 110 by the clamp fasteners 490. The clamp fasteners 490 may be any type of fastener known to those with ordinary skill in the art and capable of fastening two metal members. In other embodiments, the clamp member 482 may he attached to the side surfaces 110a of the mounting body 110 by any other form of attachment, such as a weld.

The clamp post 488, as shown in FIGS. 13 and 14, has a first end attached to the floating pin 120 and extends away from the floating pin 120 through the clamp post receiving passageway 484 to a second end opposite the first end. The clamp post 488 extends in a direction perpendicular to the floating pin 120. The first end of the clamp post 488 is attached at a center of the floating pin 120 between the side surfaces 110a and may be attached to the floating pin 120 by a fastener, such as a screw, or any other form of attachment known to those with ordinary skill in the art.

In the unlocked position U of the locking mechanism 400', the steering column 200 and friction plates 300 are movable with respect to the mounting bracket 100 as described and shown in FIGS. 10A-10D; the steering column 200, via the friction plates, 300, is capable of tilting and telescoping with respect to the mounting bracket 100 to permit a variety of steering column 200 adjustment positions.

During tilting movement in the unlocked position U, in which the floating pin 120 moves within the tilt slots 112, the clamp post 488 moves within the clamp post receiving passageway 484 along a longitudinal direction of the clamp post 488. The clamp member 482 imparts minimal friction to the clamp post 488 in the unlocked position U and the clamp post 488 is free to slide within the clamp post receiving passageway 484 during tilting movement. A portion of the clamp post 488 remains within the clamp post receiving passageway 484 in the lower tilt position TB, the upper tilt position TA, and at all positions between the lower tilt position TB and the upper tilt position TA.

When the locking lever 410 of the locking mechanism 400' is actuated to move the locking mechanism 400' from the unlocked position U to the locked position L, as described with respect to FIGS. 6 and 7 above, the ball bearing 450 imparts a normal force PF separating and pushing the bearing member 460 away from the clamp plate 430, thereby compressing the friction plates 300, the spacers 500, and the side surfaces 110a between the bearing member 460 and the fastener 424 inward toward the clamp mechanism 480. The normal force PF creates friction between the friction plates 300, the spacers 500, and the side surfaces 110a sufficient to prevent telescoping movement of the friction plates 300 with respect to the mounting bracket 100.

The inward compression of the side surfaces 110a correspondingly compresses the clamp mechanism 480 and presses the side sections 482b toward each other, narrowing the clamp member gap 486. The movement of the side sections 482b toward each other also decreases a crosssectional area of the clamp post receiving passageway 484 such that the central section 482*a* and the side sections 482*b* abut and clamp the clamp post 488 in the clamp post receiving passageway 484. A clamp force on the clamp post 488 created by the resilient compression of the clamp member 482 creates friction sufficient to prevent movement of the clamp post 488 with respect to the clamp member 482, thereby preventing tilting movement in the locked position L.

When the locking mechanism 400' is moved from the locked position L to the unlocked position U, the side sections 482*b* move away from each other due to the resilience of the clamp member 482, releasing the clamp on the clamp post 488 and permitting the clamp post 488 to move within the clamp post receiving passageway 484.

What is claimed is:

1. A steering column assembly, comprising:
    a mounting bracket;
    a steering column;
    a plurality of friction plates fixed to the steering column and attached to a side of the mounting bracket, the friction plates movable with respect to the mounting bracket;
    a plurality of inner spacers interleaved with the plurality of friction plates, each inner spacer having a scored outer surface; and
    a locking mechanism including a clamping mechanism, the locking mechanism being operable to press the inner spacers and friction plates together and to compress the clamp mechanism to lock the steering column with respect to the mounting bracket;
    wherein the clamp mechanism includes:
    a clamp member formed of a resilient material and having a central section and pair of side sections, each of the side sections attached to a side of the mounting bracket; and
    a clamp post having a first end attached to a floating pin of the mounting bracket and extending away from the floating pin through the central section of the clamp member, the floating pin is disposed within and movable along a pair of tilt slots of the mounting bracket.

2. The steering column assembly of claim 1, wherein each of the plurality of inner spacers is zinc-plated and each of the plurality of friction plates is zinc-plated.

3. The steering column assembly of claim 1, further comprising a plurality of outer spacers each abutting an outermost friction plate and disposed exterior of the outermost friction plate, the mounting bracket has a mounting body and a fixed pin having a fixed orientation with respect to the mounting body, the fixed pin extending through the mounting body, the inner spacers, and the outer spacers.

4. The steering column assembly of claim 3, wherein the mounting bracket has a pair of tilt bearings, each end of the floating pin of the mounting bracket is attached to one of the pair of tilt bearings and each of the pair of tilt bearings is disposed in one of the pair of tilt slots of the mounting body, the tilt bearings and floating pin are movable within the tilt slots along a direction of a central axis of the mounting body.

5. The steering column assembly of claim 4, further comprising a plurality of extension springs attached to the floating pin and the fixed pin, the extension springs imparting an extension spring force biasing the floating pin within the tilt slots in a direction toward the fixed pin.

6. The steering column assembly of claim 5, wherein the mounting bracket has a pair of pivot bearings each fixed approximately centrally on a side surface of the mounting body.

7. The steering column assembly of claim 6, wherein each of the friction plates has a friction plate slot and the tilt bearings and the pivot bearings are disposed in the friction plate slot, the tilt bearings and the pivot bearings move along the friction plate slots and define limits of a telescoping motion of the steering column in a longitudinal direction with respect to the mounting bracket, and the tilt bearings move along the tilt slots and define limits of a tilting motion of the steering column in a vertical direction with respect to the mounting bracket.

8. The steering column assembly of claim 3, wherein the locking mechanism includes a bearing member abutting one of the outer spacers and a locking bolt extending through and holding together the bearing member, the outer spacers, the inner spacers, the friction plates, and the mounting body, the bearing member is movable along the locking bolt by operation of a locking lever of the locking mechanism to press the outer spacers, the inner spacers, the friction plates, and the mounting body together.

9. The steering column assembly of claim 8, wherein the locking mechanism includes:
    a clamp plate having a plurality of graduated channels extending along a first surface of the clamp plate facing the bearing member; and
    a plurality of ball bearings disposed in the plurality of graduated channels and held between the clamp plate and the bearing member.

10. The steering column assembly of claim 9, wherein each of the graduated channels is variably sloped and has a cup-shaped first channel seat at a first end, a cup-shaped second channel seat at a second end opposite the first end, and a sloped surface extending between the first channel seat and the second channel seat.

11. The steering column assembly of claim 10, wherein the locking lever is attached to the clamp plate and is rotatable between an unlocked position in which the steering column is movable with respect to the mounting bracket and a locked position in which the steering column is not movable with respect to the mounting bracket;
    wherein, in the unlocked position, each of the ball bearings is positioned in the first channel seat of the graduated channel and protrudes beyond the first surface of the clamp plate by a first distance, and the first surface of the clamp plate abuts the bearing member; and
    wherein, in the locked position, each of the ball bearings is positioned in the second channel seat of the graduated channel and protrudes beyond the first surface of the clamp plate by a second distance greater than the first distance, and the ball bearings abut the bearing member and impart a normal force on the bearing member in a direction away from the clamp plate.

12. The steering column assembly of claim 1, wherein the steering column includes:
    an upper column housing fixed to the friction plates;
    an input shaft disposed in the upper column housing and rotatable within the upper column housing; and
    an intermediate column shaft having:
    a yoke connected to and rotatable with the input shaft;
    a slider shaft rotatable with the yoke and movable with respect to the yoke along a longitudinal direction of the slider shaft; and
    a column spring disposed at a connection between the slider shaft and the yoke and providing a column spring force biasing the yoke and slider shaft away from each other in the longitudinal direction.

13. A vehicle comprising the steering column assembly of claim 1.

14. A steering column assembly, comprising:
a mounting bracket having a pair of side surfaces;
a steering column;
a plurality of friction plates fixed to the steering column and each attached to one of the side surfaces of the mounting bracket, the steering column and the friction plates movable with respect to the mounting bracket in a telescoping direction and a tilting direction; and
a locking mechanism including a clamp mechanism disposed between the side surfaces of the mounting bracket, the locking mechanism is operable to compress the side surfaces toward each other and compress the clamp mechanism to prevent movement of the steering column and the friction plates in the tilting direction;
wherein the clamp mechanism includes:
a clamp member formed of a resilient material and having a central section and pair of side sections, each of the side sections attached to one of the side surfaces of the mounting bracket; and
a clamp post having a first end attached to a floating pin of the mounting bracket and extending away from the floating pin through the central section of the clamp member, the floating pin is disposed within and movable along a pair of tilt slots of the mounting bracket.

15. The steering column assembly of claim 14, further comprising a plurality of spacers each disposed on one of the side surfaces of the mounting bracket exterior of the friction plate, each spacer having a scored outer surface facing one of the friction plates.

16. A vehicle comprising the steering column assembly of claim 14.

* * * * *